United States Patent
Höbel et al.

(10) Patent No.: US 8,381,866 B2
(45) Date of Patent: Feb. 26, 2013

(54) VEHICLE TRANSMISSION

(75) Inventors: Peter Höbel, Neuhausen (DE);
Ralph-Maria Netzker, Ludwigsburg (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 311 days.

(21) Appl. No.: 12/706,876

(22) Filed: Feb. 17, 2010

(65) Prior Publication Data

US 2010/0236858 A1  Sep. 23, 2010

(30) Foreign Application Priority Data

Mar. 17, 2009  (DE) .......................... 10 2009 014 565

(51) Int. Cl.
*B60K 17/24* (2006.01)

(52) U.S. Cl. ........ 180/376; 180/374; 180/346; 180/233; 180/248; 180/292

(58) Field of Classification Search .................. 180/233, 180/245, 246, 248, 291, 292, 346–379; 74/665 F; *B60K 17/24*
See application file for complete search history.

(56) References Cited

U.S. PATENT DOCUMENTS

| | | | | |
|---|---|---|---|---|
| 4,356,878 A | * | 11/1982 | Kestian et al. ................. | 180/235 |
| 4,369,671 A | * | 1/1983 | Matsumoto et al. ........... | 475/124 |
| 4,860,612 A | | 8/1989 | Dick et al. | |
| 5,295,919 A | * | 3/1994 | Kobayashi ..................... | 475/205 |
| 7,845,453 B2 | * | 12/2010 | Nishimoto ..................... | 180/233 |
| 2003/0111285 A1 | * | 6/2003 | Gansloser et al. ............ | 180/233 |
| 2006/0048992 A1 | * | 3/2006 | Gansloser et al. ............ | 180/233 |
| 2008/0099267 A1 | * | 5/2008 | Ruehle et al. ................. | 180/233 |
| 2011/0147109 A1 | * | 6/2011 | Mair et al. .................... | 180/248 |

FOREIGN PATENT DOCUMENTS

| | | |
|---|---|---|
| AT | 5 05 334 A1 | 12/2005 |
| CN | 1036252 A | 10/1989 |
| CN | 2597324 Y | 1/2004 |
| DE | 202 12 093 U1 | 10/2002 |
| DE | 101 62 337 A1 | 7/2003 |
| DE | 10 2005 035 71 A1 | 2/2007 |
| DE | 102006043048 A1 | 3/2008 |
| JP | 61-263837 A * | 11/1986 |

OTHER PUBLICATIONS

German Search Report, dated Nov. 17, 2009.

* cited by examiner

*Primary Examiner* — Ruth Ilan
(74) *Attorney, Agent, or Firm* — RatnerPrestia

(57) ABSTRACT

A vehicle having a main transmission and a front-axle transmission, the connection of which to the main transmission is effected by a connecting shaft of rigid design, a main axis of the connecting shaft and the center line of the main transmission being positioned in such a way relative to one another that there is a lateral offset angle, a longitudinal offset angle and a rotation angle between the main axis of the connecting shaft and the center line of the main transmission.

10 Claims, 2 Drawing Sheets

VEHICLE TRANSMISSION

CROSS REFERENCE TO RELATED APPLICATIONS

This U.S. application claims priority to German Application DE 10 2009 014 565.6, filed on Mar. 17, 2009, which is incorporated by reference herein in its entirety.

FIELD OF THE INVENTION

The invention relates to a transmission arrangement for a vehicle, having a main transmission and a front-axle transmission, connection of the front-axle transmission to the main transmission being achieved by means of a connecting shaft of rigid design.

BACKGROUND OF THE INVENTION

DE 202 12 093 U1 has disclosed a drive train for vehicles with front-wheel drive and a central transmission arranged longitudinally with respect to the direction of travel, in which power transmission from the central transmission to the front-axle transmission is accomplished by means of a side shaft which is not aligned with its axis parallel to the longitudinal axis of the overall transmission.

SUMMARY OF THE INVENTION

It is an underlying object of the invention to provide a transmission arrangement for a vehicle, having a main transmission and a front-axle transmission, in which connection of the front-axle transmission to the main transmission is improved. This is achieved, according to aspects of the invention, by means of a transmission arrangement.

The transmission arrangement according to aspects of the invention is distinguished by the fact that a main axis of the connecting shaft and a centre line of the main transmission are positioned in such a way relative to one another that a lateral offset angle, a longitudinal offset angle and a rotation angle are provided between the main axis of the connecting shaft and the centre line of the main transmission. The lateral offset angle between the main axis of the connecting shaft and the centre line of the main transmission is obtained when the main axis and the centre line are projected onto a plane in a direction of the plan view and in the longitudinal direction of the transmission arrangement. The longitudinal offset angle between the main axis of the connecting shaft and the centre line of the main transmission is obtained when the main axis and the centre line are projected onto a plane from a lateral direction of the transmission arrangement. The rotation angle corresponds to an angle between a plane arranged perpendicularly and transversely to the direction of the plan view and a connecting line between the main axis and the centre line at a power transmission point between the main transmission and the connecting shaft.

With the arrangement according to aspects of the invention of the connecting shaft positioned along the side of the main transmission, it is possible to provide a lateral connecting shaft free of joints which can be placed as close as possible to the main transmission. Accordingly, there is also an advantageous integration of the connecting shaft into a narrow tunnel region of the vehicle, thus eliminating the need for additional installation space in the tunnel region to accommodate the connecting shaft. There is therefore no additional restriction in the foot well of the vehicle. By virtue of the rotation angle provided, the main transmission shaft and the connecting shaft are askew relative to one another. Consequently, power transmission from the main transmission to the connecting shaft takes place via a connecting shaft gearwheel which is arranged to the side of and below a main-transmission gearwheel. This leads to compact and advantageous accommodation of the connecting shaft along the main transmission. Moreover, the transmission arrangement according to aspects of the invention enables power to be transmitted from the main transmission to the connecting shaft by means of two conical driving wheels, thus having a positive effect on the weight and the efficiency of the transmission.

According to an advantageous embodiment of the invention, the rotation angle is in a range of from 30° to 60°, preferably in a range of from 40° to 50°. Positioning a connecting shaft at such a rotation angle in comparison with the main transmission enables the connecting shaft to be embodied without joints and allows a saving of installation space in the tunnel region of the vehicle. It is thereby possible to optimize costs and installation space. It is furthermore possible to dispense with additional joints in the connecting shaft.

According to a further embodiment of the invention, the front-axle transmission is connected directly to an engine of the vehicle, i.e. the front-axle transmission is connected directly to a section of the engine or crankcase. In the front-axle transmission according to aspects of the invention, the ring gear is preferably positioned on the inside, i.e. facing the engine. By virtue of the arrangement, according to aspects of the invention, of the front-axle transmission on the engine, there is an outside connection between the connecting shaft and the front-axle transmission which is favoured by the spatial arrangement of the connecting shaft provided. As a result, a compact arrangement of the front-axle transmission in the existing drive train is possible since the positioning of the connecting shaft in the manner provided for by the invention means that there is no need for additional installation space in the vehicle. The connecting shaft is preferably arranged along the side of the main transmission and above a transmission oil pan.

According to a further embodiment of the invention, the connecting shaft extends at least in part along the side of the main transmission, through a recess formed on a transmission-clutch bell. The connecting shaft furthermore extends at least in part along the side of the transmission, through a recess formed on a transmission-engine flange. The recess according to aspects of the invention on the transmission-clutch bell and/or the transmission-engine flange enables the connecting shaft to be passed along and in close proximity to the main transmission, allowing compact accommodation of the front-axle transmission in the drive train of the vehicle.

According to an advantageous embodiment of the invention, power transmission from the main transmission to the connecting shaft is accomplished by means of two gearwheels, each of which is provided with helical toothing and is of conical design, preferably by means of two conical gearwheels, also known as beveloid gears. The arrangement of the beveloid gears gives a connection with one tooth engagement. Frictional losses are thus small. The beveloid angle is preferably in a range of from 5° to 15°, in particular in a range of from 8° to 12°. The toothing is embodied in such a way that the axes of the main transmission and the connecting shaft do not necessarily have to lie in one plane but, in their actual embodiment, are askew with respect to one another, i.e. do not meet at any point. It is only with this freedom of arrangement that an optimum transmission and vehicle package can be achieved.

According to a further embodiment of the invention, the main transmission is designed as a dual-clutch transmission. Especially when combined with a dual-clutch transmission, the connecting shaft according to aspects of the invention provides a drive train which is of compact construction and with which the front-axle transmission can be accommodated close to the engine. The invention is also suitable for other types of transmission, e.g. for a manual transmission or an automatic transmission with planetary gearsets.

It is self-evident that the features mentioned above and those that remain to be explained can be used not only in the respective combination indicated but also in other combinations or alone without exceeding the scope of the present invention.

Further features and combinations of features will emerge from the description. Specific embodiment examples of the invention are illustrated in simplified form in the drawings and explained in greater detail in the description which follows.

DETAILED DESCRIPTION OF THE DRAWINGS

Figure 1:
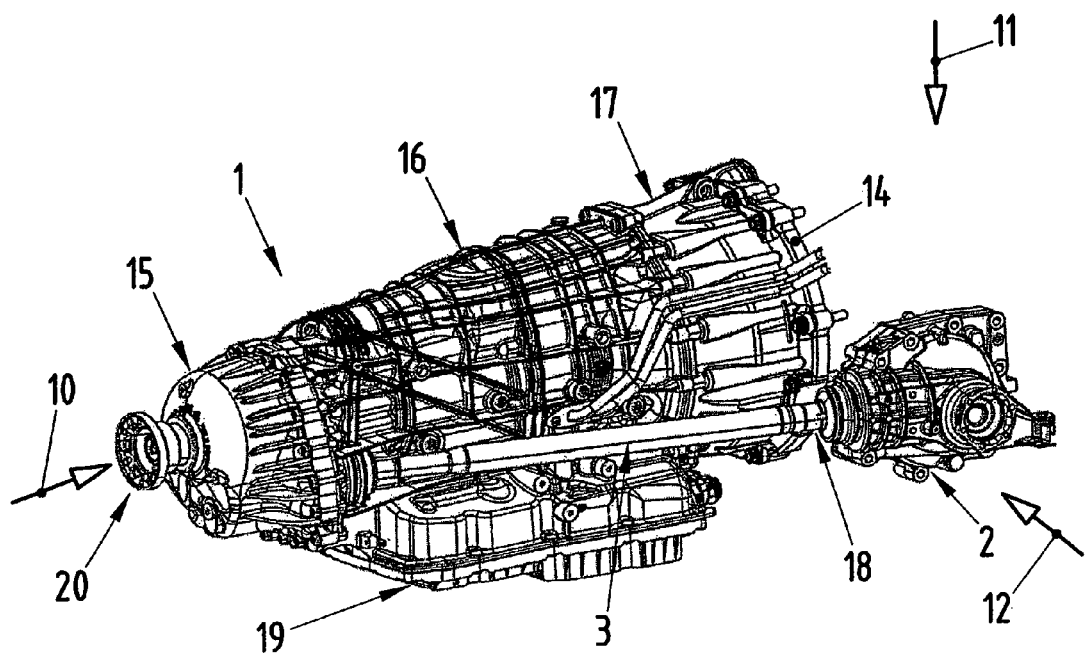
FIG. 1 shows a perspective view of a transmission arrangement with a main transmission, front-axle transmission and a connecting shaft arranged at the side.

FIG. 1 shows a transmission arrangement, which comprises a main transmission 1, a front-axle transmission 2 and a connecting shaft 3. The main transmission is accommodated in a transmission case 16, which is positioned between a transmission-clutch bell 17 and a transfer gearbox 15. Attached to the transmission-clutch bell 17 is an engine flange 14, which is connected to an engine (not shown) of a vehicle. The transfer gearbox 15, which is positioned behind the transmission case 16, has a cardan-shaft flange 20, which is connected to a cardan shaft (not shown). A transmission oil pan 19 is positioned underneath the transmission case 16. The transmission arrangement shown in FIG. 1 is preferably designed as a dual-clutch transmission and arranged in an all-wheel drive vehicle, in which the engine is positioned in the longitudinal direction of the vehicle. The front-axle transmission 2 is attached directly to the engine, a front drive axis 21 being passed through the lower half of a spherical housing (not shown) of the engine.

In the engine (not shown), a torque is produced, which is transmitted to a clutch positioned within the transmission-clutch bell by a crankshaft (not shown) of the engine. The clutch (not shown) is designed as a dual clutch and transmits a corresponding torque via a layshaft to a transmission output shaft, which is connected directly to the cardan-shaft flange. In the transfer gearbox 15, there is a selector clutch (not shown), by means of which a connection can be established between the main transmission 1 and the connecting shaft 3. Provided for this purpose in the transfer gearbox 15 is a gearwheel 4, which meshes with a first gearwheel 5 on the connecting shaft 3. Both gearwheels 4 and 5 are of conical design and thus form a beveloid drive. The torque transmitted from the main transmission 1 to the connecting shaft 3 is transmitted to the front-axle transmission 2 by the connecting shaft 3, which is of rigid design. For this purpose, a second gearwheel 6, which is designed as a pinion, is provided on the end of the connecting shaft 3, meshing with a driving wheel 7 of the front-axle transmission 2, the said wheel being designed as a ring gear. Moreover, part of the torque is transmitted is by a cardan shaft (not shown) from the transfer gearbox 15 to a rear-axle differential, which drives rear-wheel drive shafts in a manner known per se. To drive the front drive shafts, the torque transmitted from the connecting shaft 3 to the front-axle transmission 2 is transmitted to the corresponding drive shafts of the front wheels.

Figure 2:
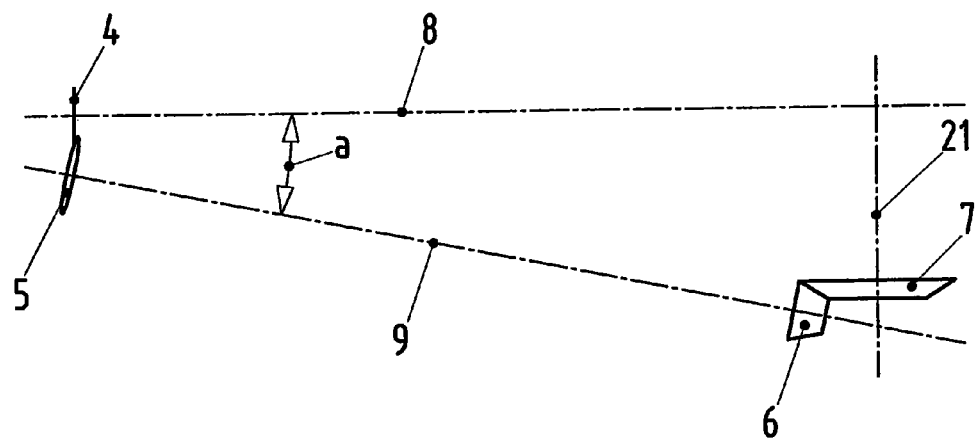
FIG. 2 shows a schematic plan view of the transmission arrangement in FIG. 1.

FIG. 2 shows a schematic plan view of the transmission arrangement in FIG. 1, the direction of the plan view being indicated by the arrow 11 in FIG. 1. From FIG. 2, it can be seen that a lateral offset angle a is provided between a main axis 9 of the connecting shaft 3 and a centre line 8 of the main transmission 1, allowing compact positioning of the connecting shaft 3 with regard to the transmission case 16. To permit more compact connection of the connecting shaft 3 to the front-axle transmission 2, a recess 18 is provided in the region of the transmission-clutch bell 17 and/or the transmission-engine flange. This makes it possible to attach the front-axle transmission 2 directly to the engine.

Figure 3:
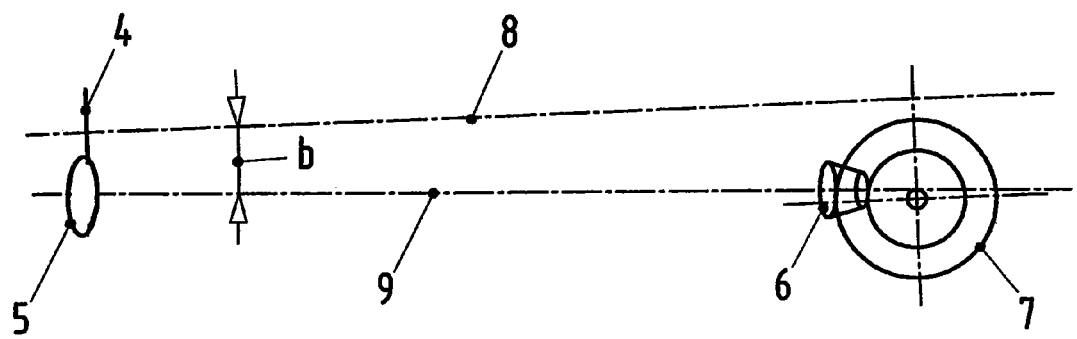
FIG. 3 shows a schematic side view of the transmission arrangement in FIG. 1.
Figure 4:
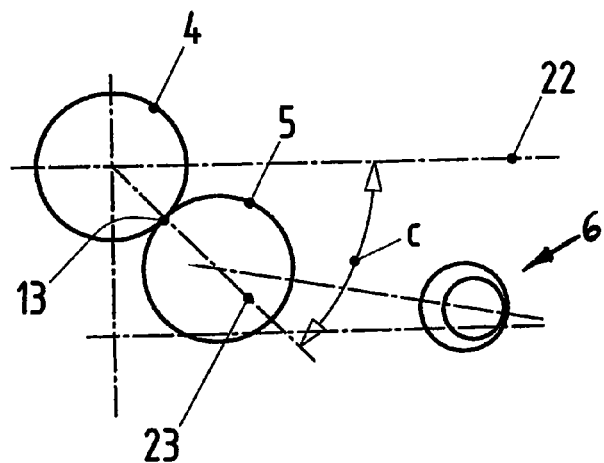
FIG. 4 shows a schematic rear view of the transmission arrangement in FIG. 1 at a power transmission point between the main transmission and the connecting shaft.

FIG. 3 shows a schematic view of the transmission arrangement in FIG. 1, showing a longitudinal offset angle b, the direction of the side view being indicated by the arrow 12 in FIG. 1. Compact routing of the connecting shaft 3 along the main transmission 1 is thereby achieved. FIG. 4 furthermore shows a rear view of the transmission arrangement in FIG. 1, the plane illustrated in FIG. 4 passing through the two gearwheels 4 and 5 and through the power transmission point 13. FIG. 4 shows the positioning of gearwheels 4 and 5 relative to one another, the direction of the rear view being indicated by the arrow 10 in FIG. 1. Gearwheel 4 forms the main-transmission gearwheel 4, which is provided in the transfer gearbox 15 and meshes with the first gearwheel 5 on the connecting shaft 3.

From FIG. 4, it can be seen that a main axis 9 of the connecting shaft 3 and a centre line 8 of the main transmission 1 are positioned in such a way relative to one another that there is a rotation angle c. The rotation angle c originates at the power transmission point 13, with the result that the first gearwheel 5 on the connecting shaft 3 is positioned to the side of and below the main-transmission gearwheel 4. The rotation angle corresponds to the angle c between a plane 22 arranged perpendicularly to the direction of the plan view and a connecting line 23 between the main axis 9 and the centre line 8 at the power transmission point 13 between the main transmission 1 and the connecting shaft 3. The two gearwheels 4 and 5 are of conical design and accordingly form a beveloid drive which allows compact positioning of the connecting shaft 3 and a rigid design of the connecting shaft, i.e. one free of joints. The arrangement of the beveloid gears 4 and 5 gives a connection with one tooth engagement. Frictional losses are thus small. The beveloid angle is preferably in a range of from 5° to 15°, in particular in a range of from 8° to 12°. The toothing is embodied in such a way that the axes of the main transmission 1 and the connecting shaft 3 do not necessarily have to lie in one plane but, in their actual embodiment, are askew with respect to one another. This arrangement allows an optimum transmission and vehicle package.

Accordingly, advantageous integration of the transfer gearbox 15 into the main transmission 1 is achieved, and expedient positioning of the front-axle transmission 2 in the tunnel region of the vehicle is made possible. Moreover, the front-axle transmission 2 can be attached at the side of the engine. Snug routing of the connecting shaft 3 along the main transmission 1 is made possible. Accordingly, the connecting shaft 3 follows the downwardly open tunnel in the direction of the front-axle transmission 2 without the use of joints, giving ideal and advantageous integration of the connecting shaft 3 into the vehicle. With the transmission arrangement according to aspects of the invention, it is possible to position the output drive at a high level in the front area of the vehicle. This favours the positioning of cross members in the vehicle underneath the transmission. Advantageous mounting of assemblies in the vehicle can therefore be accomplished, and this has a positive effect on the decoupling of engine and transmission noise.

LIST OF REFERENCE NUMBERS

1 Main transmission
2 Front-axle transmission
3 Connecting shaft
4 Main-transmission gearwheel
5 First gearwheel on the connecting shaft
6 Second gearwheel on the connecting shaft
7 Driving wheel of the front-axle transmission
8 Centre line of the main transmission
9 Main axis of the connecting shaft
10 Direction of rear view
11 Direction of plan view
12 Direction of side view
13 Power transmission point between main transmission and connecting shaft
14 Transmission-engine flange
15 Transfer gearbox
16 Transmission case
17 Transmission-clutch bell
18 Recess
19 Transmission oil pan
20 Cardan-shaft flange
21 Front drive axis
22 Plane
23 Connecting line
a Lateral offset angle
b Longitudinal offset angle
c Rotation angle

The invention claimed is:

1. Transmission arrangement for a vehicle comprising: a main transmission and a front-axle transmission, a rigid connecting shaft connecting the front-axle transmission to the main transmission, wherein power transmission from the main transmission to the connecting shaft is accomplished by a gearwheel of the main transmission that meshes with a gearwheel of the connecting shaft, and wherein a main axis of the connecting shaft and a center line of the main transmission are positioned relative to one another in such a way that there is a lateral offset angle and a longitudinal offset angle between the main axis of the connecting shaft and the center line of the main transmission, and a rotation angle is defined between (a) a horizontal plane that passes through an axis of the main transmission gearwheel and (b) a connecting line extending between the axis of the main transmission gearwheel and a power transmission point between the gearwheels, wherein the connecting shaft extends at least in part along a side of the main transmission and through a recess formed on a transmission-clutch bell.

2. Transmission arrangement according to claim 1, wherein the rotation angle is at a power transmission point between the main transmission and the connecting shaft.

3. Transmission arrangement according to claim 1, wherein the rotation angle is between 30° and 60°.

4. Transmission arrangement according to claim 1, wherein the rotation angle is between 40° and 50°.

5. Transmission arrangement according to claim 1, wherein the front-axle transmission is connected directly to an engine of the vehicle.

6. Transmission arrangement according to claim 1, wherein the connecting shaft is arranged along a side of the main transmission and at an elevation above a transmission oil pan.

7. Transmission arrangement according to claim 1, wherein each gearwheel is provided with helical toothing and/or is of a conical design.

8. Transmission arrangement according to claim 1, wherein power transmission from the connecting shaft to the front-axle transmission is accomplished by two gearwheels, each of which is provided with helical toothing and/or is of a conical design.

9. Transmission arrangement according to claim 1, wherein the main transmission is configured as a dual-clutch transmission.

10. Transmission arrangement for a vehicle comprising: a main transmission and a front-axle transmission, a rigid connecting shaft connecting the front-axle transmission to the main transmission, wherein power transmission from the main transmission to the connecting shaft is accomplished by a gearwheel of the main transmission that meshes with a gearwheel of the connecting shaft, and wherein a main axis of the connecting shaft and a center line of the main transmission are positioned relative to one another in such a way that there is a lateral offset angle and a longitudinal offset angle between the main axis of the connecting shaft and the center line of the main transmission, and a rotation angle is defined between (a) a horizontal plane that passes through an axis of the main transmission gearwheel and (b) a connecting line extending between the axis of the main transmission gearwheel and a power transmission point between the gearwheels, wherein the connecting shaft extends at least in part along a side of the main transmission and through a recess formed on a transmission-engine flange.

* * * * *